United States Patent
Lelkes et al.

(10) Patent No.: US 7,420,307 B2
(45) Date of Patent: Sep. 2, 2008

(54) BRUSHLESS MOTOR

(75) Inventors: András Lelkes, Stuttgart (DE); Markus Gummich, Pfaffenweiler (DE)

(73) Assignee: Minebea Co., Ltd., Nagano-ken (JP)

( * ) Notice: Subject to any disclaimer, the term of this patent is extended or adjusted under 35 U.S.C. 154(b) by 108 days.

(21) Appl. No.: 11/261,321

(22) Filed: Oct. 28, 2005

(65) Prior Publication Data
US 2006/0097598 A1    May 11, 2006

(30) Foreign Application Priority Data
Nov. 5, 2004    (DE) .................. 10 2004 053 907

(51) Int. Cl.
*H02K 1/00* (2006.01)
(52) U.S. Cl. .................. 310/180; 310/179; 310/68 C
(58) Field of Classification Search ......... 310/179–186, 310/254, 68 B, 68 C
See application file for complete search history.

(56) References Cited

U.S. PATENT DOCUMENTS

| | | | | |
|---|---|---|---|---|
| 4,484,114 A | * | 11/1984 | Ebbs | 318/138 |
| 5,574,342 A | * | 11/1996 | Okamoto | 318/254 |
| 5,825,113 A | * | 10/1998 | Lipo et al. | 310/181 |

* cited by examiner

*Primary Examiner*—Thanh Lam
(74) *Attorney, Agent, or Firm*—Cooper & Dunham LLP (57) ABSTRACT

The invention relates to a brushless DC motor having an at least two-pole permanent magnet rotor and an at least two-pole stator whose poles carry an at least single-strand stator winding which can be energized with a current according to the rotor position by means of an electronic commutation device, there being a substantially uniform cylindrical air gap between the rotor and the stator. The rotor is characterized in that at least one stator pole, or a specially provided auxiliary pole having an auxiliary winding, is provided which is energized with a current to start up the motor. In accordance with a preferred embodiment of the invention, the auxiliary winding can additionally be used as a sensor winding to determine the position of the rotor.

11 Claims, 7 Drawing Sheets

Fig. 5 single-strand bipolar motor having an auxiliary winding

Fig. 6

Two-strand unipolar motor with auxiliary winding

Fig. 7

Power generator for supply the auxiliary winding

Fig. 8

Thyristor circuit for supply the auxiliary winding

Fig. 9

BRUSHLESS MOTOR

The invention relates to a brushless motor according to the characteristics of the preamble in claim 1.

PRIOR ART

Unlike typical drive applications, ventilators do not require their motor to have high starting torque. This means that low-cost, single-strand brushless DC motors (BLDC motors) can be employed. These motors have a simple winding technique and low-cost commutation electronics, consisting, for example, of an H-bridge circuit. Instead of generating a rotating field, a single-strand stator winding generates a pulsating field, which is why, in certain rotor positions, the motor cannot generate any torque.

To ensure that the motor has reliable start-up in every rotor position despite this, a motor of this kind has a specially designed stator lamination stack that forms a non-uniform air gap with the rotor. This goes to produce reluctance torque which ensures that, after the power supply has been switched off, the rotor only comes to a standstill in those angular positions that allow the energized stator winding to develop sufficiently high starting torque so as to overcome bearing friction at start up. Once the motor has been started up, however, the reluctance torque that is needed to ensure reliable start-up, is no longer necessary; unfortunately, however, it is not possible to switch off this reluctance torque after start-up.

A disadvantage of this method is that increased reluctance torque creates additional vibrations in the motor. These vibrations in turn can give rise to loud, unpleasant noises in the motor. These noises are hard to predict since they depend heavily on the design and construction as well as on the mechanical resonance points of the motor application.

Another disadvantage is that, due to the irregular air gap, the average width of the air gap is increased since the minimum size of the air gap is defined on mechanical grounds. The larger average width of the air gap goes to mechanically weaken the motor, which reduces its performance and efficiency.

SUMMARY OF THE INVENTION

It is therefore the object of the invention to develop a preferably single-strand or two-strand brushless electric motor in such a way that reliable start-up is ensured without requiring a non-uniform air gap.

This object has been achieved according to the invention by an electric motor having the characteristics outlined below. A procedure to drive the motor is also outlined below.

The invention applies to the development of a preferably single-strand bipolar or two-strand unipolar brushless motor having a uniform air gap between the stator and the rotor. This kind of motor cannot generate starting torque in every rotor position. Nevertheless, to ensure reliable start-up for the motor, the invention proposes that an annular, uniform stator geometry is chosen and that reliable start-up is ensured by using an auxiliary winding. This auxiliary winding is only active in the start-up phase and is switched off after successful start-up of the motor. This auxiliary winding makes it possible to start the motor in the correct rotational direction even should the rotor be in an unfavorable position in which the main winding is unable to generate sufficient torque.

Thus, the auxiliary winding makes it possible to use a uniform air gap which goes to reduce the reluctance torque and results in a lower noise emission for the motor.

According to one embodiment of the invention, the auxiliary winding is found on an auxiliary pole taking the form of an approximately T-shaped iron core which is disposed between two stator poles and offset with respect to these poles. The iron core together with the auxiliary winding is offset by an angle of 90° electric with respect to the adjacent stator windings.

In another embodiment of the invention, an auxiliary slot extending radially is provided in the part facing the air gap of at least one stator pole in such a way that the stator pole forms two legs extending radially outwards, the auxiliary winding being disposed on one of these legs.

A third embodiment of the invention provides that the section of at least one stator pole extending in a circumferential direction has an undercut recess on one side and the auxiliary winding is disposed on this undercut recess.

According to another embodiment of the invention, the auxiliary winding can be applied to the legs that extend radially outwards of two adjacent stator poles in addition to the stator winding.

It is important that the auxiliary winding is arranged in such a way that it still ensures motor start-up when start-up using the stator winding fails.

There are two basic means of starting up the motor. The first means provides that the motor control (commutation device) first attempts to start the motor in the conventional way by energizing the main winding accordingly. If the rotor is in a favorable position before start-up, start-up is successful without requiring further action. If the motor is in an unfavorable position, start-up can fail. What is more, the electric motor could even start up in the wrong rotational direction. This means that the motor control has to monitor start-up and recognize a "false start". This can be done by evaluating the commutation signals that are generated, for example, by Hall sensors or by the auxiliary winding. In the event of an unsuccessful start-up, the motor control can activate the auxiliary winding and in this way move the rotor out of the unfavorable start position. It can then re-start the motor in the conventional way.

The second method provides that the motor control activates the auxiliary winding in general without making any other start-up attempts for a specific period of time before the actual start-up. This provides the rotor with rotational momentum after which the motor control continues the start-up and operation of the motor by energizing the stator winding accordingly.

Since the task of the auxiliary winding is basically limited to moving the rotor out of the unfavorable start position, it is sufficient to provide low-cost, unipolar energization. To this effect, a single power switch, normally a transistor (bipolar transistor, MOSFET or IGBT), is sufficient. Since this transistor is only activated for a short time, it need not be very large in size; its thermal dimensioning is non-critical.

The auxiliary winding can consist of a thin winding wire having relatively large ohmic resistance, so that the winding resistance limits the winding current to a sufficient extent. Otherwise the winding current can be limited by an additional resistor. Another way of limiting the current in the auxiliary winding is to operate the transistor in a linear operation rather than in a switch operation. This can be done, for example, using a power generator circuit. Another possibility which can be particularly advantageous for motors having high intermediate circuit voltage is the use of a low-cost thyristor to control the auxiliary winding instead of a transistor. In this case, for example, a capacitor connected in series to the auxiliary winding can ensure that the current is automatically switched off after a certain time.

Another advantageous use of the auxiliary winding can result in the creation of a sensorless motor. Brushless motors are electronically commutated, the time of commutation being mainly determined by one or more Hall sensors. Hall sensors measure the magnetic field generated by the rotor and thus the actual rotor position. For smaller motors, which are used, for example, in compact fans, SMD Hall-ICs, which are placed in a recess in the circuit board, are mostly used. In larger motors, in which the distance between the circuit board and the rotor is greater, leaded Hall-ICs are used, which are inserted into a holder and soldered, mostly later by hand, onto the circuit board. This involves not insignificant extra costs.

In the case of multi-strand motors, sensorless technology is often used where there are no discrete position sensors in the motor. Instead, the motor windings are used as sensors. The simplest method (called the back EMF method) only evaluates the voltages measurable at the motor windings, to be more precise, only the polarity of these voltages. This means that—taking the case of a three-strand motor—only three low-cost analogue comparators are needed to evaluate the polarity of the winding voltages. In block commutated three-strand brushless motors, only two of the three motor windings are energized at any point in time. The motor winding which is momentarily without current provides the information about the voltage induced within this winding, whose change in polarity explicitly determines the position of the rotor. (For details concerning the prior art see, for example: J. Krotsch, A. Lelkes, T. Zoller: "Low-noise Sensorless Commutation of Brushless DC Motor", PCIM Europe, Nürnberg 2001, Proceedings Intelligent Motion, pp. 151-156.)

In practice, sensorless motors have not achieved wide acceptance for use in single-strand motors since the single winding is normally always energized. In order to generate a gapped current (i.e. there are periods of time without any drive current), the control has to switch off the current before the actual commutation. This not only makes the control more complicated but also weakens the motor and generates additional undesirable vibrations in the motor. In the case of two-strand unipolar motors as well, sensorless technology is practically never used.

That is why a motor is proposed, as a further development on the invention, in which the auxiliary winding used for reliable start-up is used during operation as a rotor position sensor. To this effect, several known methods could be applied, although in many cases evaluating the voltage induced in this auxiliary winding is sufficient for the rotor position to be recognized.

Depending on how the motor is employed, as a fan motor for example, it is possible that the motor already rotates before it is switched on. Where there is only one single motor winding, this is problematic since the rotational direction of the motor cannot be determined from evaluating the voltage of this single winding. The use of an extra auxiliary winding can also help in this situation in that the motor control evaluates the voltage in the main winding as well as in the auxiliary winding. The evaluation of both these voltages makes it possible to unequivocally determine the rotor position and the rotational direction.

The invention is primarily described on the basis of a single-strand bipolar motor, but can equally be applied to two-strand unipolar motors which have the same start-up problems.

BRIEF DESCRIPTION OF THE DRAWINGS

The attached drawings show.

DESCRIPTION OF PREFERRED EMBODIMENTS OF THE INVENTION

Figure 1:
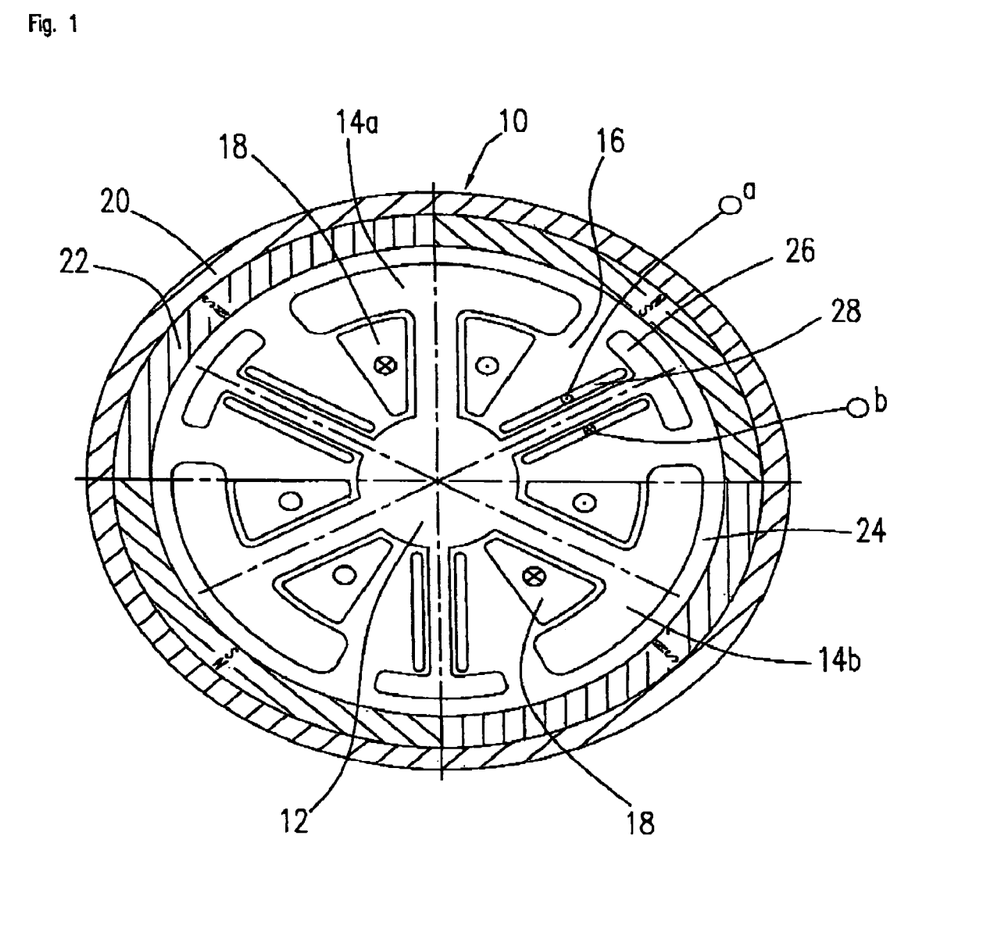
FIG. 1: a schematic section through a motor according to the invention having an auxiliary winding.
Figure 2:
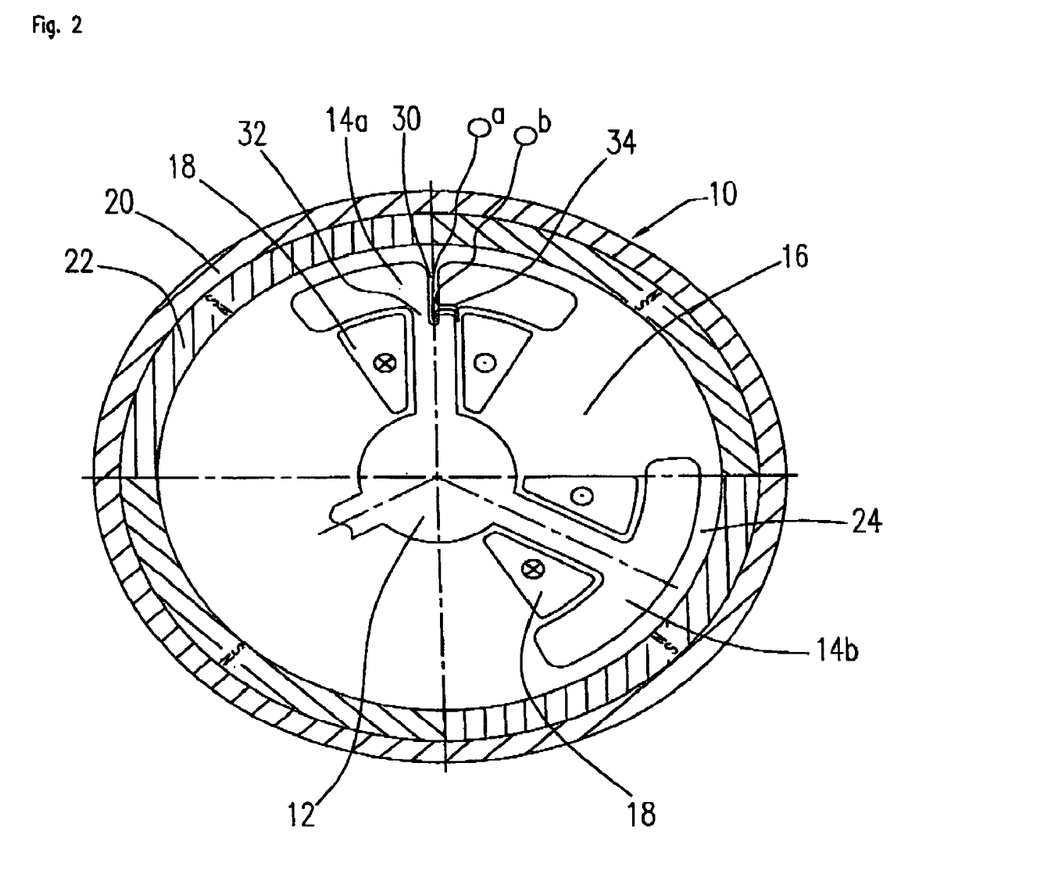
FIG. 2: a schematic section through a second embodiment of the motor according to the invention having an auxiliary winding.

The motor 10 illustrated in FIGS. 1 and 2 is a single-strand bipolar-driven brushless outer rotor motor. The motor 10 has a stator 12 consisting of a stator lamination stack having a substantially cylindrical peripheral surface and a rotor 20 in whose inside diameter a permanent magnet ring 22 is arranged in a conventional manner. In the embodiment, the stator 12 comprises three salient poles 14, of which poles 14a and 14b are illustrated in the drawing. The stator poles 14 have the conventional T-shape and define a substantially uniform cylindrical outside diameter. The stator poles 14 are separated from each other by a stator slot 16 and wound with a stator winding 18 in the usual way. It can be seen that a substantially uniform air gap 24 is produced between the outside diameter of the stator 12 and the inside diameter of the permanent magnets 22.

At least one auxiliary pole 26 is arranged between the two stator poles 14a and 14b, the auxiliary pole consisting of an iron core and having, for example, the same T-shape as used for the stator poles 14. The auxiliary pole is offset against the stator poles 14 by 90° electric and wound with an auxiliary winding 28. This auxiliary winding 28 is used to start up the motor from an unfavorable stationary position from which a conventional motor start-up would not be possible.

FIG. 2 shows an embodiment of a motor modified vis-à-vis the motor of FIG. 1. Instead of an auxiliary pole having an auxiliary winding, here a stator pole 14a comprises a long, radially extending auxiliary slot 30. The other stator poles 14b, etc., need not have such an auxiliary slot 30. The auxiliary slot 30 divides the stator pole 14a into two short radially extending legs 32, one of these legs 32 being wound with an auxiliary winding 34.

Figure 5:
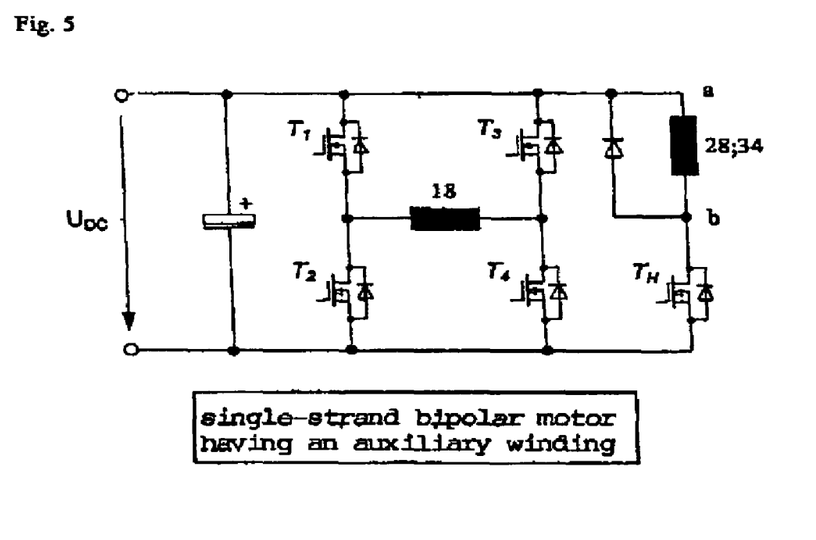
FIG. 5: a schematic representation of the power electronics for a motor according to FIGS. 1 and 2.

The contacts for the auxiliary windings 28 or 34 illustrated in FIGS. 1 and 2 are provided by connections a and b. A schematic circuit to operate the single-strand, bipolar motor according to FIGS. 1 and 2 is illustrated in FIG. 5 in conjunction with FIG. 9. A commutation device 40 or motor control supplies the power electronics to drive the motor winding, consisting, for example, of the transistors $T_1$, $T_2$, $T_3$ and $T_4$, with a current. The transistors $T_1$ to $T_4$ form an H-bridge circuit, the transistors $T_1$ and $T_4$ or $T_2$ and $T_3$ being conductive at the same time, so that the polarity of the current in the motor winding 18 is reversed after each half rotation of the rotor. The time at which the polarity is reversed is measured by the commutation device 40, a Hall sensor generally being disposed in the motor which measures the magnetic field of the rotor and relays the rotor position to the commutation device 40 which switches the transistors $T_1$ to $T_4$ according to the rotor position.

Figure 9:
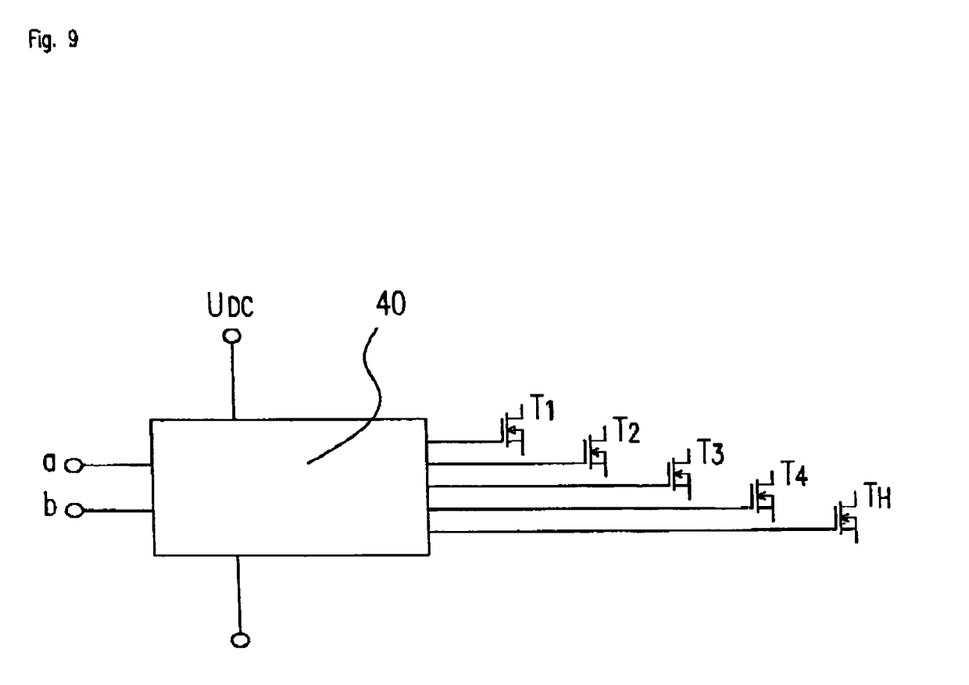
FIG. 9: a schematic representation of the motor control (commutation device) to drive the power electronics of the motor.

The power electronics comprise another transistor $T_H$ which is used to switch the auxiliary winding 28 or 34. Should the commutation device 40 find that motor start-up cannot be achieved by energizing the stator winding 18 in the conventional way, transistor $T_H$, which supplies the auxiliary winding 28 or 34 with a current, is switched making it possible to start the motor since the auxiliary winding 28, 34 is offset against the motor winding 18 at a specific angle thus allowing a dead center of the rotor 20 to be overcome by the auxiliary winding.

After motor start-up, the current in the auxiliary winding 28, 34 is switched off. However, the auxiliary winding 28, 34 can subsequently take on an additional task in that the voltage induced in the auxiliary winding while the motor is in operation is measured by the commutation device 40. To this effect, the connections a and b of the auxiliary winding 28, 34 are connected to appropriate inputs of the commutation device 40, so that the commutation device 40 can determine the position of the rotor 20 from the intensity of the induced voltage or the polarity of the induced voltage. This means that there is no longer need for any discrete sensors, such as Hall sensors, to determine the position of the rotor. The auxiliary winding 28, 34 thus fulfils two tasks: on the one hand it ensures that the motor starts up reliably in that it is accordingly supplied with a current by the commutation device 40 at motor start-up and, on the other hand, the position of the rotor can be determined by evaluating the voltage induced in the auxiliary winding.

Figure 7:
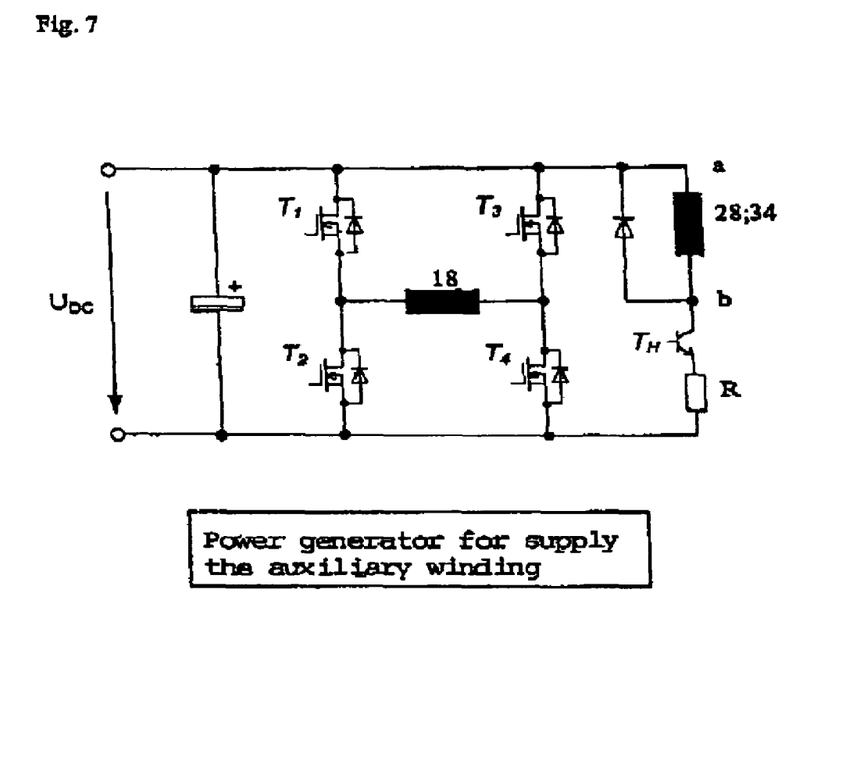
FIG. 7: a schematic representation of the power electronics to drive a motor according to FIGS. 1 and 2.

FIG. 7 shows a circuit to drive the auxiliary winding 28, 34 modified slightly with respect to FIG. 5. In this circuit, transistor $T_H$ is in linear operation, the current through the auxiliary winding 28, 34 being limited by a resistor R.

Figure 8:
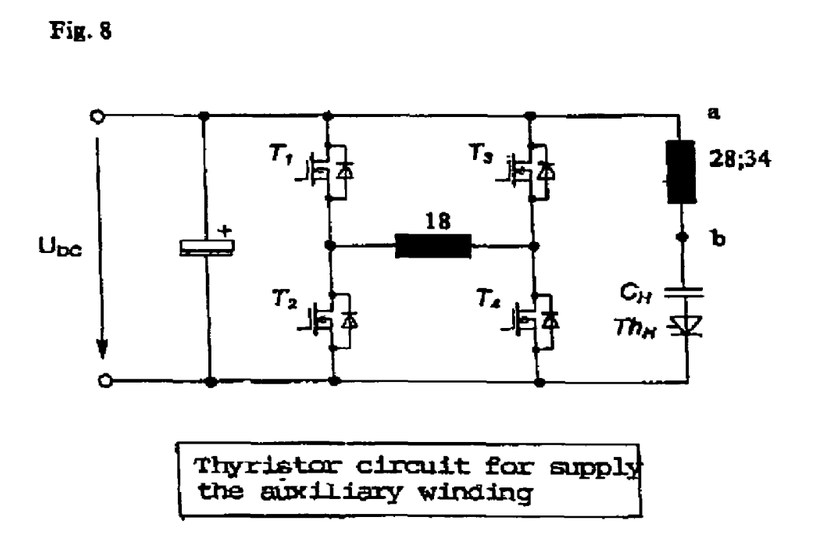
FIG. 8: a schematic representation of the power electronics to drive a motor according to FIGS. 1 and 2.

FIG. 8 shows a circuit to drive the auxiliary winding 28, 34 that operates with a thyristor. A capacitor $C_H$ is connected in series to the auxiliary winding, the capacitor charging when the thyristor is switched on and automatically reducing the current through the auxiliary winding after a specific period of time, so that the thyristor switches off.

Figure 3:
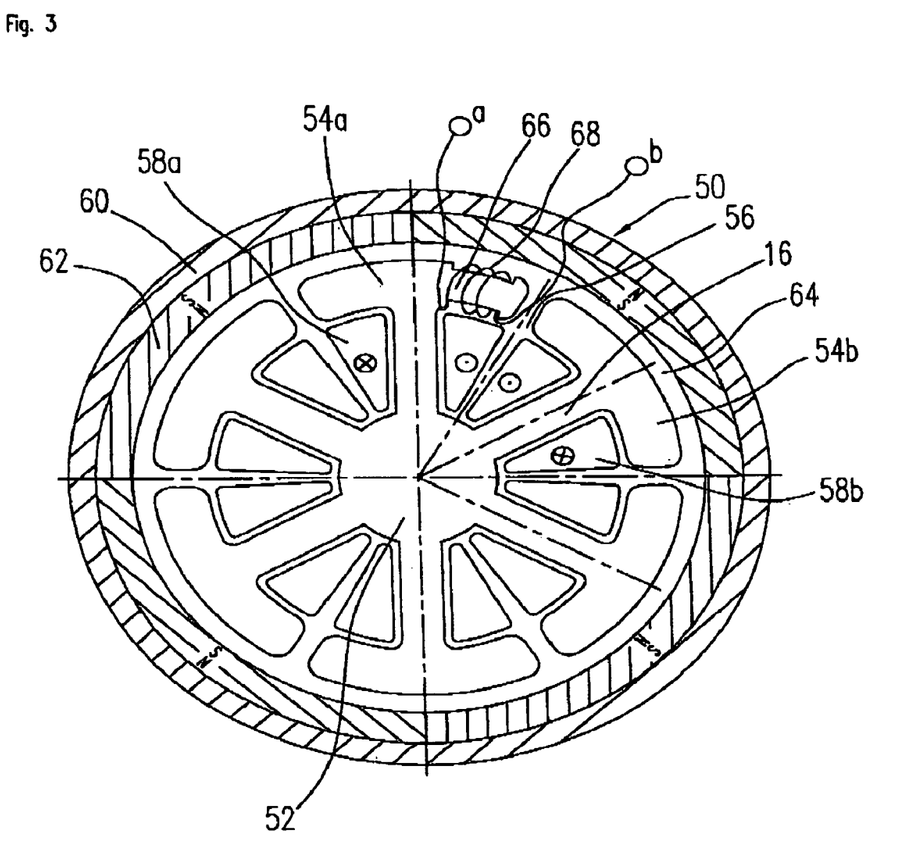
FIG. 3: a schematic section through a third embodiment of the motor according to the invention having an auxiliary winding.
Figure 4:
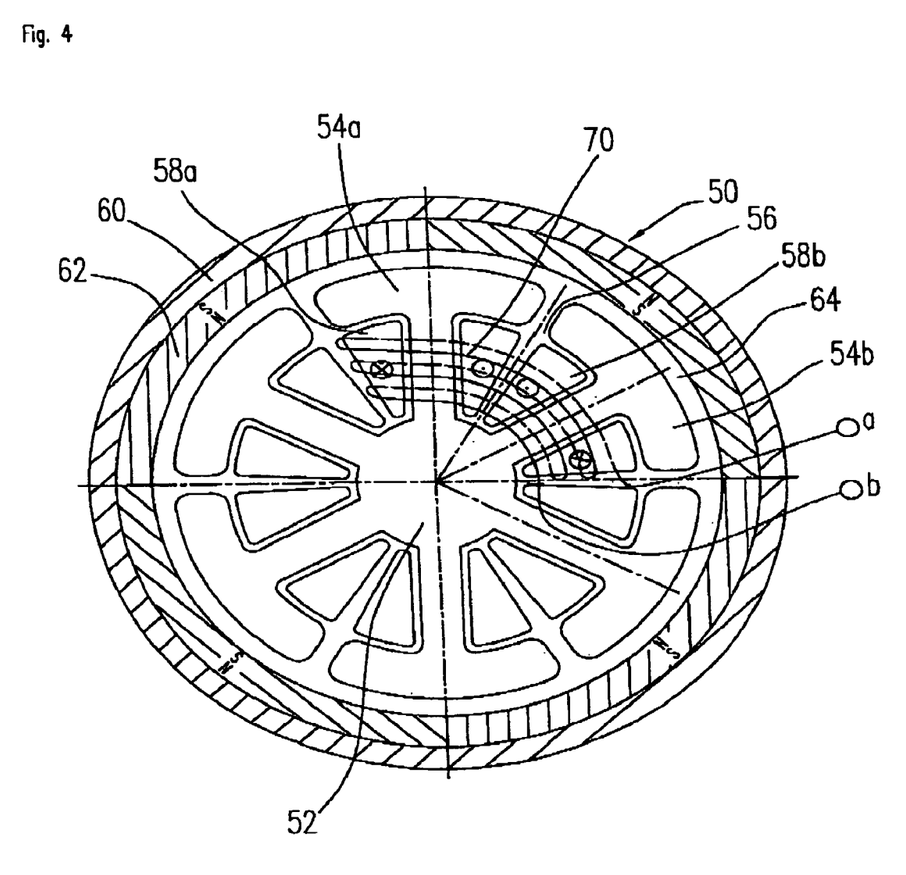
FIG. 4: a schematic section through a fourth embodiment of the motor according to the invention having an auxiliary winding.

FIGS. 3 and 4 show a two-strand unipolar-driven motor 50. The motor again comprises a stator 52, consisting of a lamination stack and, for example, six discrete stator poles 54a, 54b ... which again have an approximately T-shaped form and define a cylindrical outside diameter. Stator slots 56 are found between the stator poles 54, the stator poles being alternatively wound with two strands of a stator winding 58a or 58b. The motor designed as an outer rotor motor comprises a rotor 60 on whose inside diameter a ring magnet 62 is disposed in a conventional way. An air gap 64 remains between the outside diameter of the stator and the inside diameter of the ring magnet, the air gap having a uniform cylindrical shape according to the invention.

According to FIG. 3, a free end of the T-shaped stator poles 54a has an undercut recess 66 which is wound with an auxiliary winding 68 whose connections a and b are led to the outside. The auxiliary winding is offset against the stator windings 58 at a specific angle and facilitates motor start-up when the rotor is in an unfavorable position in that the auxiliary winding is energized with a current.

The embodiment according to FIG. 4 shows substantially the same motor as in FIG. 3, the stator pole 54a, however, not having an undercut recess with the respective auxiliary winding. Instead, an auxiliary winding 70 is wound over the stator windings 58a and 58b of two adjacent stator poles 54a and 54b, which again ensures motor start-up when the rotor is in an unfavorable position in that the auxiliary winding is energized with a current.

Figure 6:
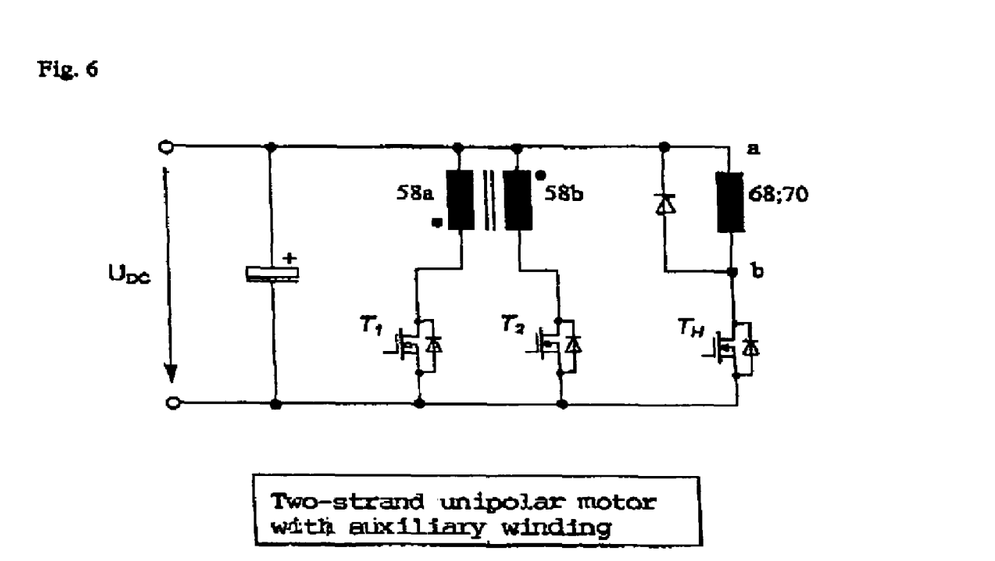
FIG. 6: a schematic representation of the power electronics for a motor according to FIGS. 3 and 4.

FIG. 6, in conjunction with FIG. 9, shows a schematic circuit to operate the two-strand motor according to FIGS. 3 and 4. Each strand 58a or 58b of the motor is alternatively switched by a transistor $T_1$ or $T_2$ in accordance with FIG. 6. The auxiliary winding 68 or 70 is energized via a transistor $T_H$. Thus in the commutation device 40 according to FIG. 9, only the control outputs for the transistors $T_1$, $T_2$ and $T_H$ are necessary. The auxiliary winding can again be used to measure the position of the rotor in that the connections a and b are connected to corresponding inputs of the commutation device 40. The commutation device evaluates the voltage induced in the auxiliary winding 68 or 70 or its polarity and can thus determine the position of the rotor so that the transistors $T_1$ and $T_2$ can supply the stator windings 58a, 58b with a current according to the position of the rotor.

IDENTIFICATION REFERENCE LIST

10 Motor
12 Stator (lamination stack)
14 Stator poles (14a, 14b, ... )
16 Stator slot
18 Stator winding, single-strand
20 Rotor (outer rotor)
22 Permanent magnet (ring segments)
24 Air gap
26 Auxiliary pole
28 Auxiliary winding
30 Auxiliary slot
32 Leg
34 Auxiliary winding
40 Commutation device
50 Motor
52 Stator stack
54 Stator poles (54a, 54b, ... )
56 Stator slot
58 Stator windings (58a, 58b)
60 Rotor (outer rotor)
62 Permanent magnet (ring segments)
64 Air gap
66 Undercut
68 Auxiliary winding
70 Auxiliary winding
a, b Connections of the auxiliary winding

The invention claimed is:

1. A brushless DC motor (10; 50) having an at least two-pole permanent magnet rotor (20; 60) and an at least two-pole stator (12; 52) whose poles (14; 54) carry an at least single-strand stator winding (18; 58) which can be energized with a current according to the rotor position by means of an electronic commutation device (40), there being a substantially uniform cylindrical air gap (24; 64) between the rotor and the stator, characterized in that the motor is a sensorless motor and at least one stator pole (14; 54), or a specially provided auxiliary pole (26) having an auxiliary winding (28; 34; 68; 70), is provided which is energized with a current to start up the motor.

2. A motor according to claim 1, characterized in that the connections (a, b) of the auxiliary winding (28; 34; 68; 70) are connected to inputs of the commutation device (40) which determines the position of the rotor on the basis of the voltage induced in the auxiliary winding.

3. A motor according to claim 1, characterized in that the auxiliary pole (26) carrying the auxiliary winding (28) is designed as an approximately T-shaped iron core and arranged between two stator poles (14a, 14b) and offset with respect to these stator poles.

4. A motor according to claim 3, characterized in that he auxiliary winding (28) is offset against the adjacent parts of the stator winding (18) by an angle of 90° electric.

5. A motor according to claim 1, characterized in that the auxiliary winding (28; 34; 68; 70) can be unipolarly energized with a current by means of an electric switch ($T_H$; $Th_H$).

6. A motor according to claim 1, characterized in that the auxiliary winding (28; 34; 68; 70) has a specific resistance that limits the current flow in the auxiliary winding to a set value.

7. A motor according to claim 1, characterized in that the motor is a single-strand bipolar driven motor.

8. A method for the operation of a brushless DC motor (10; 50) having an at least two-pole permanent magnet rotor (20; 60) and an at least two-pole stator (12; 52) whose poles (14; 54) carry an at least single-strand stator winding (18; 58), the stator winding being energized with a current according to the rotor position by means of an electronic commutation device (40), and the rotor and the stator being separated from each other by a substantially cylindrical air gap (24; 64), characterized in that at the start-up of the motor at least one auxiliary winding (28; 34; 68; 70) is energized with a current, the auxiliary winding being disposed on at least one stator pole (14; 54) or on a specially provided auxiliary pole (26), the current applied to the auxiliary winding being switched off once the motor has started up, further characterized in that the voltage induced in the auxiliary winding (28; 34; 68; 70) during the operation of the motor is measured in the commutation device (40) and the actual position of the rotor is determined from this.

9. A method for the operation of a brushless DC motor (10; 50) having an at least two-pole permanent magnet rotor (20; 60) and an at least two-pole stator (12; 52) whose poles (14; 54) carry an at least single-strand stator winding (18; 58), the stator winding being energized with a current according to the rotor position by means of an electronic commutation device (40), and the rotor and the stator being separated from each other by a substantially cylindrical air gap (24; 64), characterized in that at the start-up of the motor at least one auxiliary winding (28; 34; 68; 70) is energized with a current, the auxiliary winding being disposed on at least one stator pole (14; 54) or on a specially provided auxiliary pole (26), the current applied to the auxiliary winding being switched off once the motor has started up, further characterized in that the commutation device (40) first attempts to achieve motor start-up by energizing the at least one stator winding (18; 58) accordingly, and if no rotor movement is detected by the commutation device, motor start-up is effected by energizing the auxiliary winding (28; 34; 68; 70).

10. A method for the operation of a brushless DC motor (10; 50) having an at least two-pole permanent magnet rotor (20; 60) and an at least two-pole stator (12; 52) whose poles (14; 54) carry an at least single-strand stator winding (18; 58), the stator winding being energized with a current according to the rotor position by means of an electronic commutation device (40), and the rotor and the stator being separated from each other by a substantially cylindrical air gap (24; 64), characterized in that at the start-up of the motor at least one auxiliary winding (28; 34; 68; 70) is energized with a current, the auxiliary winding being disposed on at least one stator pole (14; 54) or on a specially provided auxiliary pole (26), the current applied to the auxiliary winding being switched off once the motor has started up, further characterized in that the commutation device (40) effects motor start-up by energizing the auxiliary winding (28; 34; 68; 70) and the subsequent energization of the at least one stator winding (18; 58).

11. A method according to claim 8, characterized in that the auxiliary winding (28; 34; 68; 70) has unipolar energization.

* * * * *